Aug. 31, 1926.

A. L. ALAJ 1,598,410

FOOD DISPLAYING, PROTECTING, AND PLATE SUPPORTING DEVICE

Filed Jan. 30, 1926

INVENTOR.
Antoine L. Alaj,
BY
Geo. P. Kimmel.
ATTORNEY.

Patented Aug. 31, 1926.

1,598,410

UNITED STATES PATENT OFFICE.

ANTOINE L. ALAJ, OF CHICAGO, ILLINOIS.

FOOD DISPLAYING, PROTECTING, AND PLATE-SUPPORTING DEVICE.

Application filed January 30, 1926. Serial No. 85,012.

This invention relates to a combined food displaying, protecting and plate supporting device, and has for its object to provide, in a manner as hereinafter set forth, a transparent device of the class referred to for displaying in an attractive and sanitary manner articles of food, such as pies, cakes, salads, fruit, etc., as well as to protect the displayed foods hygienically, preserve the full flavor thereof, keeping it fresh for a long period and retaining its fresh appearance, and furthermore to provide whereby a series of the devices, in accordance with this invention, can be arranged in superimposed relation for removably supporting superposed plates, in spaced relation, carrying articles of food and with the food enclosed and protected by the superposed devices, requiring thereby a small space for display purposes, or in other words materially reducing the space required for displaying the articles of food, but at the same time displaying the food in an unusually attractive manner which will appeal to a patron.

Further objects of the invention are to provide, in a manner as hereinafter set forth, a combined food displaying, protecting and plate supporting device, which is simple in its construction and arrangement, strong, durable, in the form of a transparent annulus having its top and bottom edges provided with cushioning or buffing means to protect such edges when the device is arranged with respect to a pair of food supporting plates, having means to provide vents for the discharge of hot air and also to provide for the circulation of air through the device when arranged in protecting position with respect to the food, thoroughly efficient in its use, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
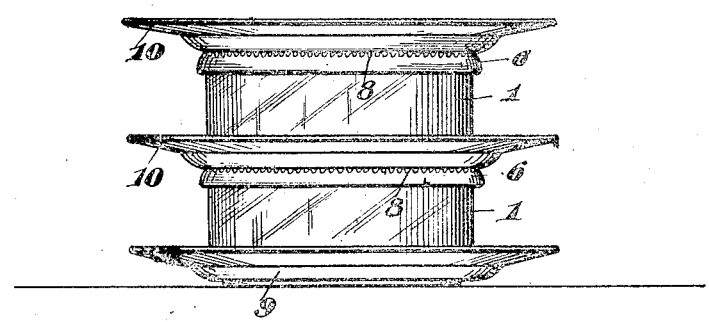
Figure 1 is an elevation of a plurality of superposed combined food displaying, protecting and plate supporting devices illustrating the same in connection with a plurality of superposed food supporting plates arranged in spaced relation.
Figure 3:
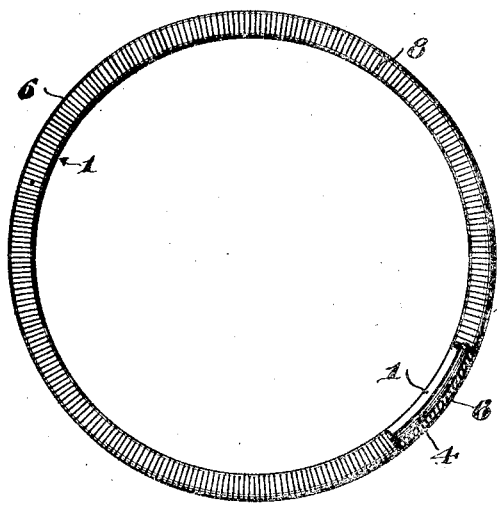
Figure 3 is top plan view of the device partly broken away.
Figure 2:
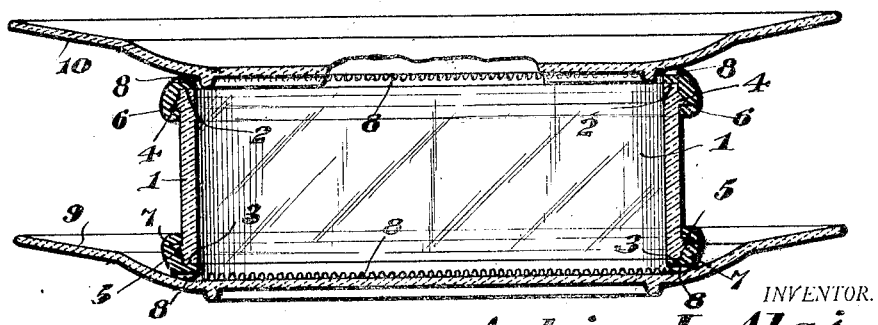
Figure 2 is a cross sectional view of the device showing the adaptation thereof in connection with a pair of food supporting plates.

Referring to Figures 1, 2 and 3 of the drawings a combined food displaying, protecting and plate supporting device, in accordance with this invention, comprises a body portion 1, constructed of any suitable transparent material, preferably glass, and which is in the form of an annulus. The body portion 1 is of any suitable diameter and thickness and has a flat top edge 2 and a flat bottom edge 3. Formed integral with the outer periphery of the body portion 1, in proximity to its top edge and also in proximity to its bottom edge is a laterally extending annular flange. Each of the flanges, in cross section, is of right angled triangular contour. The flanges are oppositely disposed with respect to each other and that flange in proximity to the edge 2 is indicated at 4 and the flange in proximity to the edge 3 is indicated at 5. Each of the flanges provide means for connecting to the body portion 1 a resilient cushioning member which is arranged in protective position with respect to an edge of the body portion 1.

The cushioning members when arranged in position encircle the outer periphery of the body portion 1, enclose the flanges and extend upon the edges of the body portion and further are flushed with the inner face of the latter. That cushioning member which associates with the flange 4 is indicated at 6 and the one which associates with the flange 5 is indicated at 7. The cushioning members are co-extensive with the edges of the body portion 1 and that portion of each cushioning member which protects an edge of the body portion 1 has its outer face formed with transversely extending grooves or corrugated to provide transversely extending grooves which are indicated at 8 and constitute vents when the body portion 1 is mounted upon a plate 9 and when a plate 10 is positioned upon the body portion, in a manner as shown in Figure 2. The vents provide means for circulation of air through the body portion 1 when the latter is mounted with respect to a pair of superposed plates. Further the vents provide for the discharge of steam given off from an article of food or for the discharge of hot air caused by the hot food mounted or supported by the plate 9 and enclosed by the body portion 1.

When the cushioning and protecting members 6 and 7 are mounted on the body portion 1, the opposed spaces of the flanges 4, 5, act as means to retain the said members in position and with reference to Figures 1 and 2, when the body portion is arranged in protective and display position with respect to an article of food, the body portion 1 is mounted on one plate and another plate is positioned upon the top of the body portion and a stack of devices, with respect to spaced food supporting plates, can be set up in a manner as illustrated in Figure 1, under such conditions requiring a small space for displaying the articles of food carried by the food supporting plates.

Figure 4:
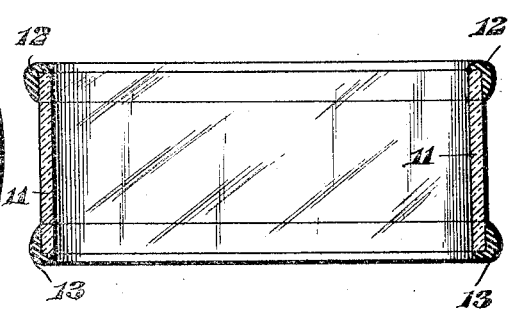
Figure 4 is a section illustrating a modification.

Referring to Figure 4 of the drawings 11 denotes a transparent body portion in the form of an annulus and which is not provided with the ribs 4, 5, but is provided with a cushioning member 12 at its top and a cushioning member 13 at its bottom. The cushioning members are secured by a suitable adhesive to the body portion 11 and overlap the top and bottom edges thereof. The cushioning members 12 and 13 perform the same function as the cushioning members 6 and 7.

It is thought that the many advantages of a combined food displaying, protecting and plate supporting device, in accordance with this invention, can be readily understood, and although the preferred embodiment of the invention is as illustrated and described, yet it is to be understood that changes in the details of construction can be had which will fall within the scope of the invention as claimed.

What I claim is:—

1. A combined food displaying, protecting and plate supporting device comprising a transparent body portion of band like shape, and a resilient cushioning member secured to the top and bottom of said body portion and overlapping the edges thereof.

2. A combined food displaying, protecting and plate supporting device comprising a transparent body portion of band like shape, resilient cushioning members, each of said members surrounding the outer periphery of and overlapping an edge of said body portion, and means projecting from the outer periphery of the body portion for securing said members thereto.

3. A combined food displaying, protecting and plate supporting device comprising a transparent body portion of band like shape, a resilient cushioning member secured to the top and bottom of said body portion and overlapping the edges thereof, and each of said members provided with means to constitute vents for the interior of the body portion.

4. A combined food displaying, protecting and plate supporting device comprising a transparent body portion of band like shape, resilient cushioning members, each of said members surrounding the outer periphery of and overlapping an edge of said body portion, means projecting from the outer periphery of the body portion for securing said members thereto, and each of said members provided with means to constitute vents for the interior of the body portion.

5. A combined food displaying, protecting and plate supporting device comprising a transparent body portion in the form of an annulus, a resilient cushioning member positioned at the top and bottom of said body portion and overlapping and co-extensive with an edge thereof, and spaced flanges projecting from the periphery of said body portion for securing said members in position.

6. A combined food displaying, protecting and plate supporting device comprising a transparent body portion in the form of an annulus, a resilient cushioning member positioned at the top and bottom of said body portion and overlapping and co-extensive with an edge thereof, spaced flanges projecting from the periphery of said body portion for securing said members in position, and each of said members provided with means to constitute vents for the interior of the body portion.

7. A combined food displaying, protecting and plate supporting device comprising a transparent body portion in the form of an annulus, a resilient cushioning member positioned at the top and bottom of said body portion and overlapping and co-extensive with an edge thereof, spaced flanges projecting from the periphery of said body portion for securing said members in position, said flanges being oppositely disposed, and each of said flanges in cross section being of right angled triangular contour.

In testimony whereof, I affix my signature hereto.

ANTOINE L. ALAJ.